(12) United States Patent
Simmons

(10) Patent No.: US 7,373,759 B1
(45) Date of Patent: May 20, 2008

(54) CABLE TRAY SUPPORT ASSEMBLY

(76) Inventor: George E. Simmons, 1073 79th St. South, St. Petersburg, FL (US) 33743

( * ) Notice: Subject to any disclaimer, the term of this patent is extended or adjusted under 35 U.S.C. 154(b) by 0 days.

(21) Appl. No.: 10/299,579

(22) Filed: Nov. 18, 2002

Related U.S. Application Data

(63) Continuation-in-part of application No. 09/873,122, filed on May 31, 2001, now Pat. No. 6,672,022.

(60) Provisional application No. 60/208,258, filed on May 31, 2000.

(51) Int. Cl.
*E04B 5/48* (2006.01)

(52) U.S. Cl. .................. 52/220.5; 52/126.6; 52/126.2; 52/220.1; 52/263; 52/220.2; 248/188.1; 248/49

(58) Field of Classification Search .............. 52/126.2, 52/126.6, 220.1, 220.2, 220.5, 263; 248/188.1, 248/188.5, 235, 49; 174/48; 211/192, 126.15
See application file for complete search history.

(56) References Cited

U.S. PATENT DOCUMENTS

| | | | | | |
|---|---|---|---|---|---|
| 2,744,795 | A | * | 5/1956 | McDonough et al. | 182/183.1 |
| 2,895,619 | A | * | 7/1959 | Frazier | 211/192 |
| 3,045,834 | A | * | 7/1962 | Seiz | 211/191 |
| 3,065,506 | A | * | 11/1962 | Tremer | 52/126.6 |
| 3,080,980 | A | * | 3/1963 | Gibbons | 248/222.52 |
| 3,637,183 | A | * | 1/1972 | Sagers | 248/235 |
| 3,771,273 | A | * | 11/1973 | Brodie | 52/646 |
| 3,893,271 | A | * | 7/1975 | Kotlarz | 52/168 |
| 4,079,678 | A | * | 3/1978 | Champagne | 108/110 |
| 4,106,738 | A | * | 8/1978 | Kostecky | 248/235 |
| 4,439,052 | A | * | 3/1984 | Wallther | 403/49 |
| 4,494,896 | A | * | 1/1985 | DiFranco | 410/148 |
| 4,596,095 | A | | 6/1986 | Chalfant | |
| 4,630,417 | A | * | 12/1986 | Collier | 52/263 |
| 4,676,036 | A | | 6/1987 | Bessert | |
| 4,850,162 | A | | 7/1989 | Albrecht | |
| RE33,220 | E | | 5/1990 | Collier | |
| 4,934,858 | A | * | 6/1990 | Beaulieu | 403/174 |
| 4,960,253 | A | * | 10/1990 | Perrault et al. | 248/68.1 |

(Continued)

FOREIGN PATENT DOCUMENTS

DE 2244596 3/1974

(Continued)

*Primary Examiner*—Richard Chilcot
*Assistant Examiner*—Phi Dieu Tran A
(74) *Attorney, Agent, or Firm*—Needle & Rosenberg, P.C.

(57) ABSTRACT

A cable tray support assembly for a raised floor system which has a plurality of support pedestals and a platform section. Each support pedestal has an elongated stringer member, a first upright channel member, and an opposing second upright channel member. The stringer member has an opposing pair of flanges depending from the proximal and distal ends of the stringer member. In use, the flanges of the stringer member may be releasably connected to the channel members so that the elongated stringer member is supported above the respective bottom ends of the channel members. At least one of the channel members of each support pedestal may be positioned adjacent to at least a portion of one column to aid in maintaining spatial orientation of the channel member with respect to an upright column. One platform section is suspended from the stringer members of a pair of opposing support pedestals.

23 Claims, 10 Drawing Sheets

U.S. PATENT DOCUMENTS

| | | | |
|---|---|---|---|
| 4,989,817 A * | 2/1991 | Camilleri | 248/231.91 |
| 5,049,700 A | 9/1991 | Kobayashi et al. | |
| 5,100,086 A | 3/1992 | Rinderer | |
| 5,316,244 A * | 5/1994 | Zetena, Jr. | 248/49 |
| 5,389,737 A | 2/1995 | Kobayashi et al. | |
| 5,477,649 A | 12/1995 | Bessert | |
| 5,546,717 A | 8/1996 | Penczak et al. | |
| 5,548,932 A | 8/1996 | Mead | |
| 5,704,174 A * | 1/1998 | Dal Lago | 52/220.5 |
| 5,787,663 A | 8/1998 | Wehrmann | |
| 5,791,096 A | 8/1998 | Chen | |
| 5,839,702 A | 11/1998 | Jette | |
| 5,953,870 A | 9/1999 | Jette | |
| 6,019,323 A | 2/2000 | Jette | |
| 6,061,884 A | 5/2000 | Ohmas et al. | |
| 6,394,398 B1 * | 5/2002 | Reed et al. | 248/57 |
| 6,427,400 B1 | 8/2002 | Greenblatt | |
| 2002/0014045 A1 | 2/2002 | Jette | |
| 2002/0078638 A1 | 6/2002 | Huang | |

FOREIGN PATENT DOCUMENTS

| | | | | |
|---|---|---|---|---|
| FR | 418167 | | 9/1990 | |
| FR | 2812775 | | 2/2002 | |
| GB | 2202246 | * | 9/1988 | 52/263 |
| JP | 89965 | * | 3/1992 | 52/263 |

* cited by examiner

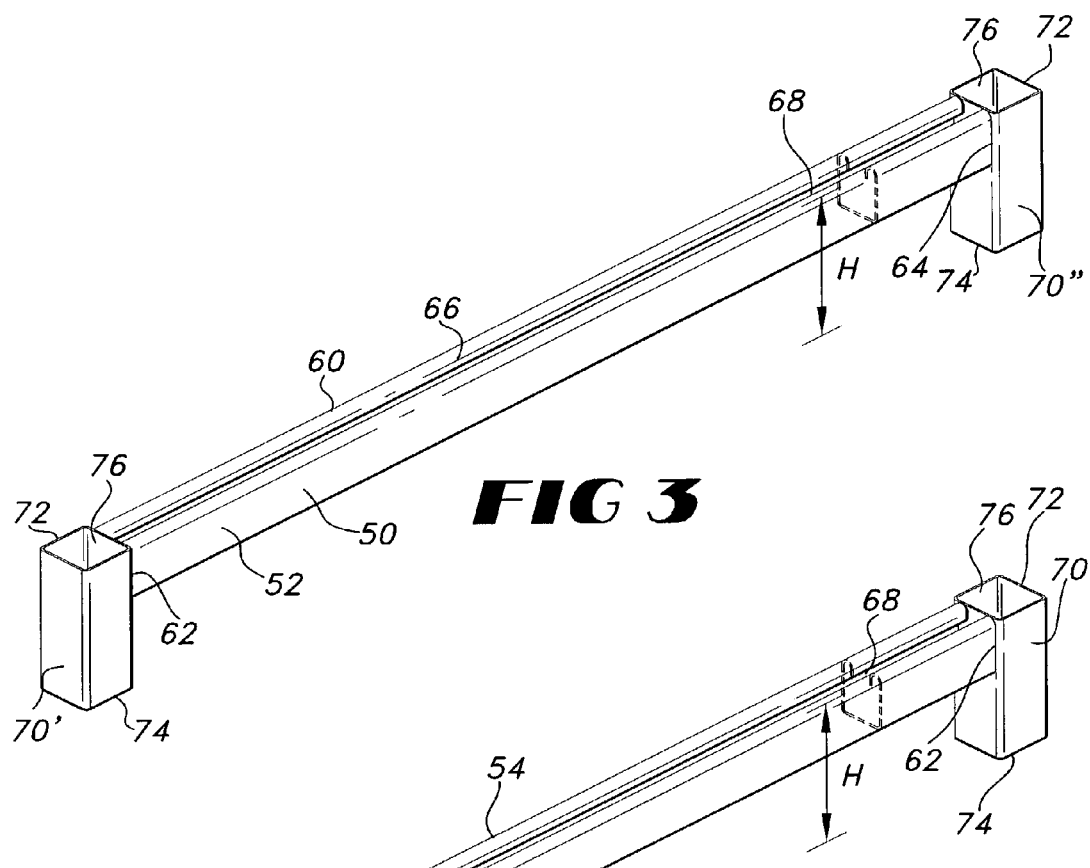
FIG 3
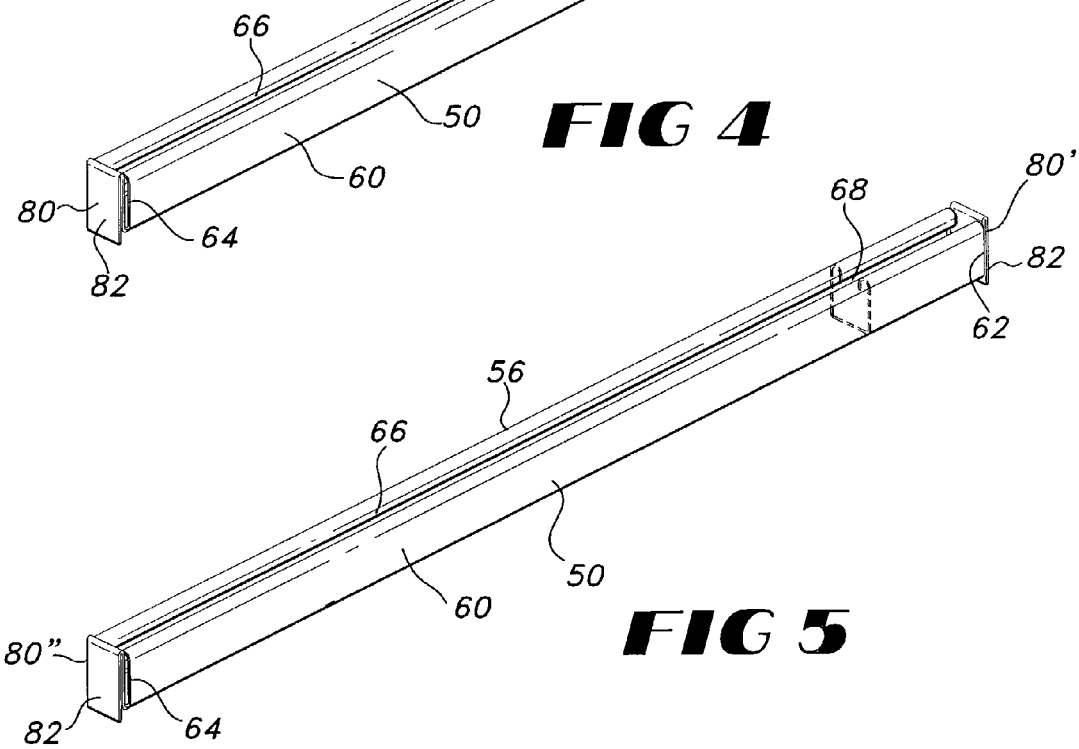
FIG 4
FIG 5

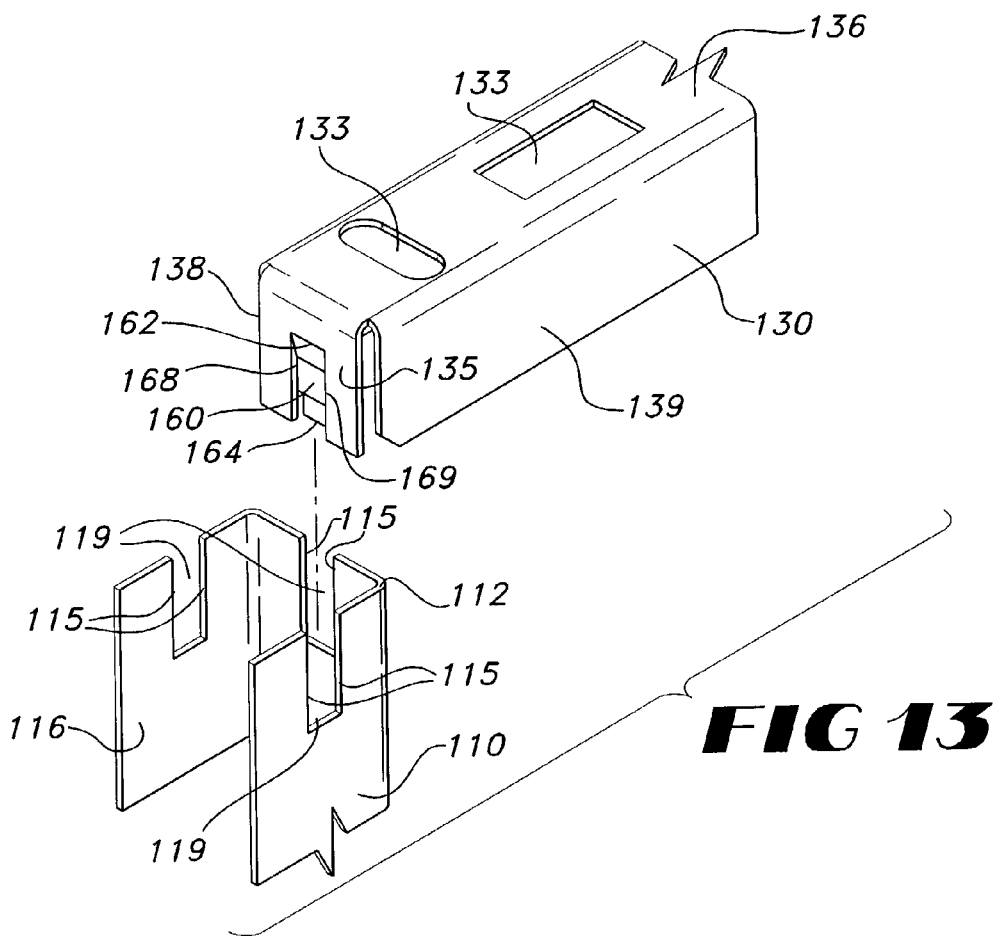
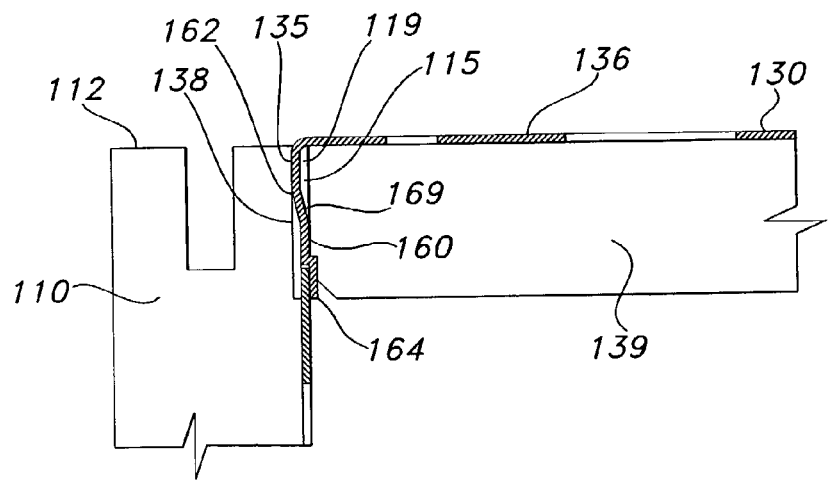

CABLE TRAY SUPPORT ASSEMBLY

This application is a continuation-in-part of U.S. application Ser. No. 09/873,122, filed May 31, 2001, now U.S. Pat. No. 6,672,022 which claims priority to the U.S. provisional application 60/208,258, filed May 31, 2000, which is incorporated herein in its entirety.

FIELD OF THE INVENTION

The present invention relates to raised floor systems and more particularly to a cable tray support assembly for use in connection with a raised floor system.

BACKGROUND OF THE INVENTION

Cable trays in general have been used in power stations and large industrial plants for a number of years to support and route various cables through the plants rather than placing these cables inside a conduit. These cable trays are normally supported from a wall or a ceiling at levels which are above a person's head in order to avoid obstructing normal floor space. An alternative to the elevated cable tray has been elevated distribution ducts which are also normally mounted from a wall or a ceiling at elevations so as not to interfere with a person standing on the floor and thus, again, conserve floor space.

In many multi-floor buildings, a current practice is to utilize poured concrete floors. Electrical conductor distribution ducts are normally provided within the poured concrete of these floors in order to provide electrical power distribution to various locations within the building. These electrical power distribution ducts are permanently located within the poured concrete making it impossible to accommodate the rearrangement of equipment as both the use of the floor space changes as well as to accommodate the changes in the equipment due to changes in technology. This has lead to the development of raised floors for certain uses of floor space.

Computer rooms, data processing rooms and electronic equipment rooms, in general, are examples of room uses wherein the overhead wiring distribution approach and/or the power distribution ducts have been partially or totally replaced by the distribution of wires and cables on top of the concrete subfloor and below a removable panel raised floor on which the electrical equipment is placed. These raised floors are normally supported on column assemblies and the area below the raised floor is designed to be utilized as access for the distribution of the various electrical cables.

With the increased complexity of electronic equipment and the increasing number of pieces of equipment being placed in a single room due to the equipment continuously becoming smaller, the interconnection of these pieces of electronic equipment by communication cables and power cables has become more complex. The space between the subfloor and the raised panel floor is somewhat restricted and there may be times when there is moisture on the concrete subfloor such as due to condensation. Cables lying on the concrete subfloor have to remain unaffected by the moisture on the subfloor and these cables also need to avoid the problems associated with entanglement. Cables simply lying on a concrete subfloor can become so entangled that it is difficult to remove one particular cable from the mass of cables on the subfloor should the individual cable need to be changed or rerouted for any reason.

Prior art cable trays have been developed to eliminate some of the problems associated with the routing of cables beneath the raised panel floor. Most prior art cable trays are simply placed on the concrete subfloor. Other cable tray designs are suspended from the structure which supports the removable panels of the raised panel floor. These prior art designs are normally suspended between the raised panel floor and the concrete subfloor and provide an organized route for the various cables to travel in order to interconnect the numerous pieces of electronic equipment placed on the raised panel floor.

While the introduction of these prior art cable trays has significantly reduced the entanglement and moisture problems associated with the concrete subfloors, they are not without their problems. As the number of pieces of electronic equipment being placed in a single room increases so does the number of electrical cables. Consequently the number of electrical cables which are being placed within the prior art cable trays is also increasing. This increasing number of cables in the prior art cable trays can now lead to an entanglement problem within the tray. In addition, when it is desired to have specific cables kept separate from each other, the prior art cable trays are used to route one, or one set of cables, while the second or other set of cables, which need to be kept separate, are routed across the concrete subfloor encountering the problems explained above.

Accordingly, there is a need for a cable management system which can accommodate the larger number of cables being routed beneath the raised panel floor as well as providing for the separate routing of specific cables without relying on the subfloor beneath the raised panel floor for routing of cables. Further, there is a continuing need for improved cable management systems which require fewer number of components. A need also exists for raised floor and cable management systems which are easier to install than existing systems and which provide increased storage capacity and accessibility. Finally, a need exists for cable management systems that do not apply stress onto the raised floor systems.

SUMMARY OF THE INVENTION

The present invention provides a cable tray support assembly that has lower material and labor costs to install to form a complete raised floor and cable management system. The present cable management system also encompasses upgrading an existing raised floor system with the presently disclosed cable tray support assembly.

Typically, a raised floor system is provided which includes a plurality of upright columns and a plurality of floor panels support by the columns. The columns are disposed on a subfloor in a predetermined grid array and are spaced apart from each other a first predetermined distance. In one aspect of the present invention, the cable tray support assembly includes a plurality of pedestals and a platform section. Each pedestal has a pair of opposing, spaced, upright channel members and an elongated stringer member. Each channel member defines a channel extending from a top end to a bottom end of the channel member. A portion of the channel of at least one of the channel members may be positioned adjacent to at least a portion of one column of the raised floor system to spatially orient the pedestal relative to the floor system.

The elongated stringer member has an opposing pair of downwardly extending flanges. One flange depends from a proximal end of the stringer member and is removably connected to one channel member of the pedestal. The other flange depends from the distal end of the stringer member and is removably connected to the remaining channel member of the pedestal such that the stringer member is supported above the bottom ends of the opposing pair of channel members. The stringer member further has a horizontally disposed surface extending between the proximal and distal ends of the stringer member.

Each platform section is configured and dimensioned to support lengths of cable. One platform section is suspended from the stringer members of a pair of pedestals, which may be positioned in opposition to each other. The platform section has a proximal edge and an opposed distal edge and at least a portion of the proximal and distal edges of the platform section forms a downwardly extending flange. The flange of the platform section may be operatively received within at least one opening in the horizontally disposed surface of the stringer element.

BRIEF DESCRIPTION OF THE DRAWINGS

FIG. 3 is a perspective view of a first embodiment of a support pedestal, showing a first support pedestal having a first sleeve member, a second sleeve member, and an elongated stringer member connected to and extending between the first and second sleeve members and showing a cross-sectional view of the stringer member.

FIG. 4 is a perspective view of an alternative embodiment of a support pedestal, showing a second support pedestal having a sleeve member, a hanger member, and an elongated stringer member connected to and extending between the sleeve member and the hanger member and showing a cross-sectional view of the stringer member.

FIG. 5 is a perspective view of an alternative embodiment of a support pedestal, showing a third support pedestal having a first hanger member, a second hanger member, and an elongated stringer member connected to and extending between the first and second hanger members and showing a cross-sectional view of the stringer member.

FIG. 13 is a partial exploded perspective view of a top end of a channel member defining a slot and a distal end of a stringer member defining a tongue.

FIG. 14 is a partial cross-sectional side view of the cable tray support assembly shown in FIG. 11, showing an elongate tongue member in the flange of a stringer member releasably connected to a slot defined in a channel member of a pedestal.

DETAILED DESCRIPTION OF THE INVENTION

The present invention is more particularly described in the following examples that are intended to be illustrative only since numerous modifications and variations therein will be apparent to those skilled in the art. As used in the specification and in the claims, the singular form "a," "an," and "the" may include plural referents unless the context clearly dictates otherwise.

The present invention provides the art with a raised floor and cable management system which requires many fewer components to assemble thereby resulting in greatly reduced material and labor costs to install a complete raised floor and cable management system. The present invention also encompasses upgrading an existing raised floor system with the presently disclosed cable support assembly.

Figure 1:
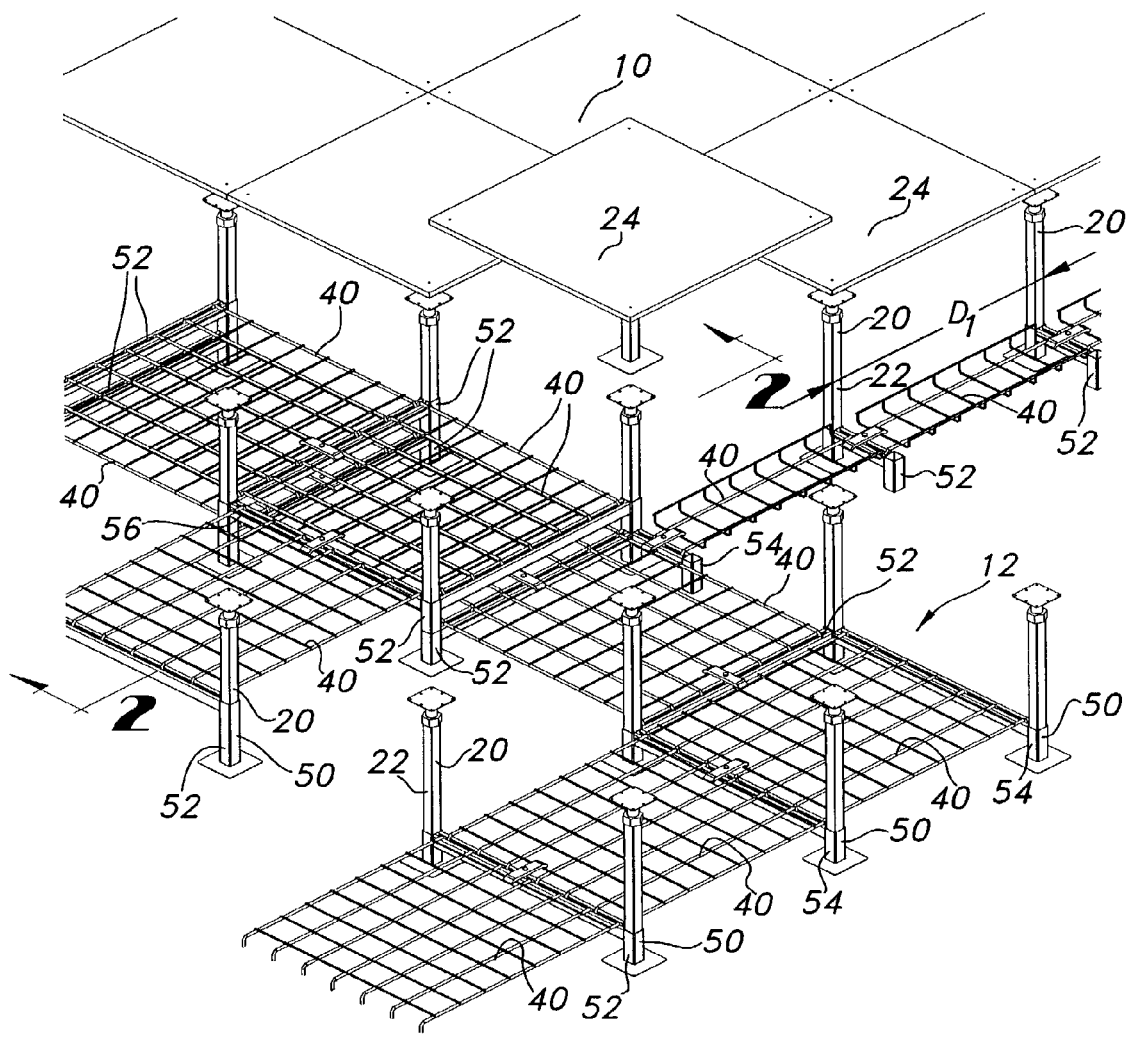
FIG. 1 is a partial perspective view of one embodiment of a raised floor system constructed in accordance with the present disclosure.

Referring now in specific detail to the drawings in which like reference numerals designate like or equivalent elements throughout the several views, and initially to FIG. 1, one embodiment of a raised floor system incorporating a cable tray support assembly of the present invention is designated generally by the reference number 10. The raised floor system 10 is especially adaptable to be used in an electronic equipment room, such as a room containing computer or data processing equipment. The room has a permanent floor or subfloor 12 which may be the usual concrete floor of a typical building. The raised floor system 10 is supported above the subfloor 12 at a height which is typically about 12 inches, although this height can be varied.

Generally, the raised floor system 10 includes a plurality of upright support columns 20 and a plurality of floor panels 24. The support columns 20 are disposed in a predetermined grid array on a base such as the subfloor 12. The support columns 20 support the raised floor surface formed from the plurality of floor panels 24. Each support column 20 has a shaped body portion 22. Typically, the support columns 20 are supported by and are usually secured to subfloor 12 in a regular grid pattern of columns and rows. As one will appreciate, when disposed on the subfloor 12, any two adjacent support columns in a row or column of the predetermined grid array forms a pair of support columns that are separated and spaced apart from each other a first predetermined distance $D_1$. Preferably, the first predetermined distance D, corresponds with the size of the floor panels. However, other grid patterns can be used if desired.

Figure 2:
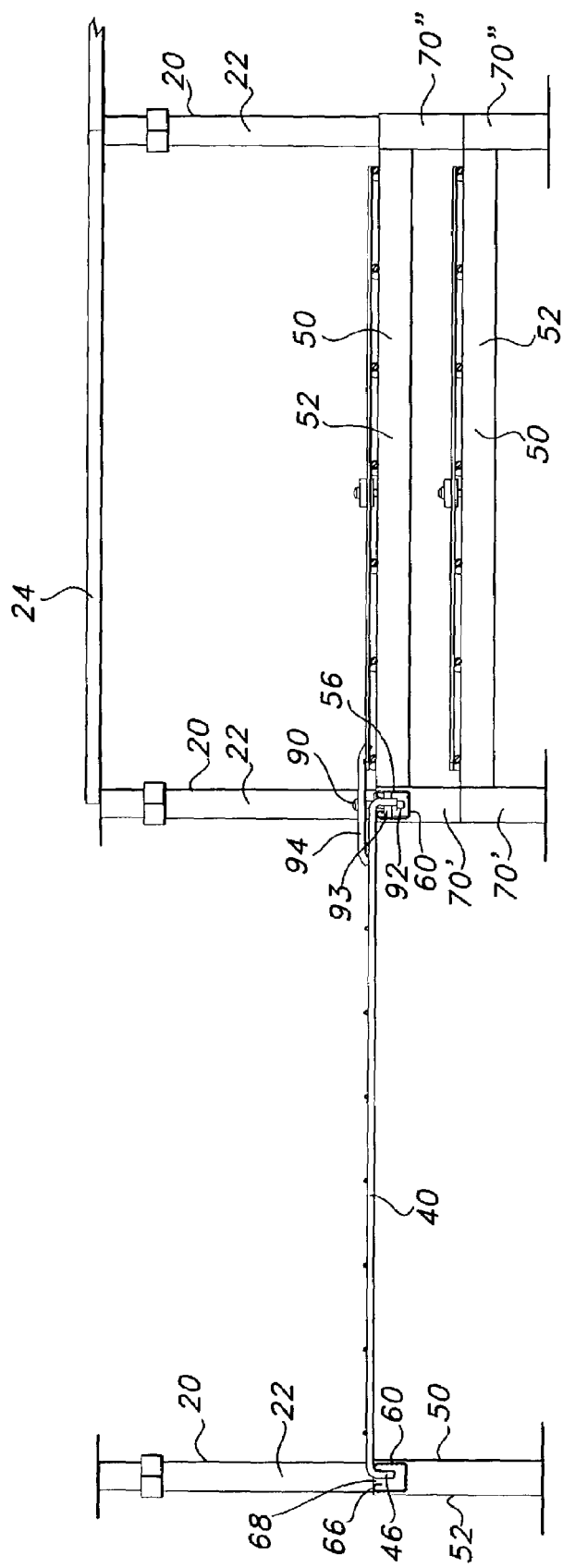
FIG. 2 is a side view of multiple levels of first support pedestals and platform sections installed between the floor panels and a subfloor taken along section 2—2 of FIG. 1.

In one embodiment, a cable tray support assembly 26 includes, as shown in FIGS. 1–3, a plurality of first support pedestals 52 and a platform section 40. By installing a plurality of first support pedestals 52 over a series of columns 20, a pattern of first support pedestals 52 can be assembled to support one or more platform sections 40 along a specific route between subfloor 12 and the upper surface of raised floor assembly 10. Generally, the height of the first support pedestals 52 can be varied to position platform sections 40 at a more convenient level. Further, the width of the first support pedestals 52 can be varied to accommodate platform sections 40 of variable width. In addition, if the need arises to have multiple routes for cables between subfloor 12 and the upper surface of raised floor system 10, a multiple number of first support pedestals 52 can be removably connected on the respective pairs of columns 20 to provide support for a multiple number of platform sections 40 to form multiple levels of platform sections 40 between the subfloor 12 and the floor panels 24. As one will also appreciate, the connection that occurs between the support pedestals 50 and the support columns 20 provides an excellent electrical ground for the cable tray assembly.

Each first support pedestal 52 has an elongated stringer member 60, a first upright sleeve member 70', and a second upright sleeve member 70". The stringer member 60 has a proximal end 62 and an opposed distal end 64. Each stringer member 60 has a horizontally disposed surface 66 that defines an open channel 68 (in cross-section) extending therein. Each sleeve member 70 has a top end 72, a bottom end 74, and defines a bore 76 extending from the top end 72 through the bottom end 74. The first sleeve member 70' is attached to the proximal end 62 of the stringer member 60 and the second sleeve member 70" is attached to the distal end 64 of the stringer member 60.

By attaching the stringer member 60 proximate the respective top ends 72 of the first and second sleeve members 70', 70", the elongated stringer member 60 is supported above the respective bottom ends 74 of the first and second sleeve members 70', 70" at a predetermined height H. As one skilled in the art will appreciate, by varying the length of the first and second sleeve members 70', 70" between the top and bottom ends 72, 74, the predetermined height H of the stringer member 60 relative to the bottom ends 74 of the first support pedestal 52 may be varied. It is contemplated that first support pedestals 52 having varied predetermined heights H may be used in the raised floor system 10. For example, a platform section 40 supported by a first support pedestal 52 having a predetermined height H of, for example, 6 inches, may be operatively connected to a platform section 40 supported by a pair of stacked first support pedestals 50 which each have a predetermined height H of, for example, 3 inches (for a combined height of approximately 6 inches). Further, to accommodate platform sections 40 of variable width, the first and second sleeve members 70', 70" of the first support pedestal 52 may be spaced apart less then or equal to the first predetermined distance $D_1$.

At least one of the first and second sleeve members 70', 70" of each first support pedestal 52 is removably connected, in overlying registration, to the body portion 22 of one support column 20 of a pair of support columns to form one pair of opposing first support pedestals 52. If the first and second sleeve members 70', 70" of the first support pedestal 52 are spaced apart the first predetermined distance $D_1$, then the first and second sleeve members 70', 70" of each first support pedestal 52 are removably connected, in overlying registration, to the body portion 22 of the two support columns 20 forming the pair of support columns.

For example, to assemble a portion of the cable tray assembly 26 to the raised floor system 10, the first and second sleeve members 70', 70" of one first support pedestal 52 may be removably connected to the respective body portions 22 of a first pair of support columns 20 and the first and second sleeve members 70', 70" of an opposing first support pedestal 52 may be removably connected to the respective body portions 22 of a second pair of support columns 20 to form a pair of opposing first support pedestals 52. Alternatively, it is contemplated that, if the width of the first support pedestal 52 is less than the first predetermined distance $D_1$, one of either the first or the second sleeve members 70', 70" of each of the opposing first support pedestals 52 will be removably connected to the body portions 22 of two adjacent support columns 20 to form the pair of opposing first support pedestals. The sleeve member 70 of the first support pedestal 52 that is not connected to the support column 20 may be disposed on and supported by the subfloor 12 or, if multiple levels of the cable tray assembly 26 are being constructed, by the sleeve member 70 of an underlying first support pedestal 52.

Preferably the bore 76 of the sleeve members 70 has a shape that is complementary to the exterior surface shape of the body portion 22 of the support column 20. For example, as shown in FIG. 1, both the body portion 22 of the support column 20 and the bore 76 of the sleeve members 70 are generally rectangular or square in cross-section. It is contemplated that any complementary cross-sectional shape made be used for the bore 76 and the body portion 22, such as, for example, a rectangular shape, a circular shape, a triangular shape, a keyed shape, and the like. As one will appreciate, having complementary shapes for the bore 76 of the sleeve members 70 and the body portion 22 of the support columns 20 allows for quick and orderly orientation of the individual support pedestals 50 relative to the connected support columns 20 which decreases labor costs because the installation may be completed in less time. However, there is no requirement that the bore 76 of the sleeve members 70 and the body portion 22 of the support columns 20 have a complementary shape, i.e., for example the body portion 22 could have a circular cross-section and the bore 76 could have a square cross-section. It is only necessary for the bore 76 of the sleeve member 70 to be able to be placed into removable overlying registration with the body portion 22 of the support column 20.

Alternatively, the cable tray support assembly 26 may also include a second embodiment of a support pedestal 50 which is shown in FIGS. 1 and 4. The construction of the second support pedestal 54 is similar to the first support pedestal 52 and, accordingly, the figures use the same reference number for similar components. Furthermore, the components in FIGS. 1–4 that use the same reference numbers are substantially equivalent and the description thereof is omitted for the second embodiment.

In the second embodiment, the cable tray assembly may include a second support pedestal 54 having an elongated stringer member 60, an upright sleeve member 70, and a hanger member 80. The sleeve member 70 is connected to a proximal end 62 of the stringer member 60 and defines a bore 76 that extends from a top end 72 to a bottom end 74 of the sleeve member 70. The hanger member 80 is connected to a distal end 64 of the stringer member 60 and has a terminal hook portion 82 that is oriented downwardly away from the horizontally disposed surface 66 of the stringer member 60 and generally parallel to the distal end 64 of the stringer member 60. In cross-section, the terminal hook portion 82 has an inverted "U" shape when inserted for engagement with a sleeve member 70 as discussed below.

In use, the hanger member 80 of one second support pedestal 54 may be removably connected to a sleeve member 70 of an adjacent first or second support pedestal 52, 54. As one will appreciate, when the terminal hook portion 82 of the hanger member 80 is connected to the sleeve member 70 of the respective first or second support pedestal 52, 54, the elongated stringer members 60 of the joined support pedestals 50 are substantially co-planar. Similar to the first support pedestal 52, the height of the second support pedestal 54 relative to the bottom end 74 of the sleeve member 70 can be varied by varying the longitudinal length of the sleeve member 70 to position platform sections 40 at a more convenient level. Further, the width of the second support pedestal 54 can be varied to accommodate platform sections 40 of variable width.

For example, if the hanger member 80 and the sleeve member 70 of the second support pedestal 54 are spaced apart the first predetermined distance $D_1$, then the sleeve member 70 of the second support pedestal 54 is removably connected, in overlying registration, to the body portion 22 of one of two support columns 20 forming a pair of support columns and the terminal hook portion 82 of the hanger member 80 is removably connected to the sleeve member 70 of the other support column 20 of the pair of support columns. Alternatively, it is contemplated that, if the width of the second support pedestal 54 is less than the first predetermined distance D1, the sleeve member 70 of the second support pedestal 54 will be disposed on and supported by the subfloor 12 or, if multiple levels of the cable tray assembly 26 are being constructed and the predetermined height of the second support pedestal 54 is not sufficient to place the stringer members 60 of the connected support pedestals in co-planar relationship, by the sleeve member 70 of an underlying second support pedestal 54.

Alternatively, the cable tray support assembly 26 may also include a third embodiment of a support pedestal 50 which is shown in FIGS. 1 and 5. The construction of the third support pedestal 56 is similar to the first and second support pedestals 52, 54 and, accordingly, the figures use the same reference number for similar components. Furthermore, the components in FIGS. 1–5 that use the same reference numbers are substantially equivalent and the description thereof is omitted for the third embodiment.

In the third embodiment, the cable tray assembly 26 may include third support pedestal 56 having an elongated stringer member 60, a first hanger member 80', and a second hanger member 80". The first hanger member 80' is connected to a proximal end 62 of the stringer member 60 and the second hanger member 80" is connected to a distal end 64 of the stringer member 60. As noted above, each hanger member 80', 80" has a terminal hook portion 82 that is oriented downwardly away from the horizontally disposed surface 66 of the stringer member 60 and generally parallel to the respective proximal and distal ends 62, 64 of the stringer member 60.

In use, the first and second hanger members 80', 80" of one third support pedestal 56 may be removably connected to an opposing pair of sleeve members 70 of a pair of opposing support pedestals 50, such as a pair of opposing first support pedestals 52, a pair of opposing second support pedestals 54, or a pair formed from an opposing first and a second support pedestals 52, 54. For example, the first and second hanger members 80', 80" of one third support pedestal 56 may be removably connected to an opposing pair of first sleeve members 70' of a pair of opposing first support pedestals 52, an opposing pair of second sleeve members 70" of a pair of opposing first support pedestals 52, an opposing pair of sleeve members 70 of a pair of opposing second support pedestals 54, or an opposing pair of sleeve members 70 formed from either a first or second sleeve member 70', 70" of a first support pedestal 52 and a sleeve member 70 of a second support pedestal 54. When connected to the respective opposing sleeve members 70, the elongated stringer member 60 of the third support pedestal 56 is substantially co-planar with the stringer members 60 of the two adjoining support pedestals 50.

It will be appreciated that the described system provides significant savings in material costs and installation labor costs in comparison with prior art cable tray systems which require the cable tray assembly to be mechanically fastened to the every "connected" column.

Figure 6:
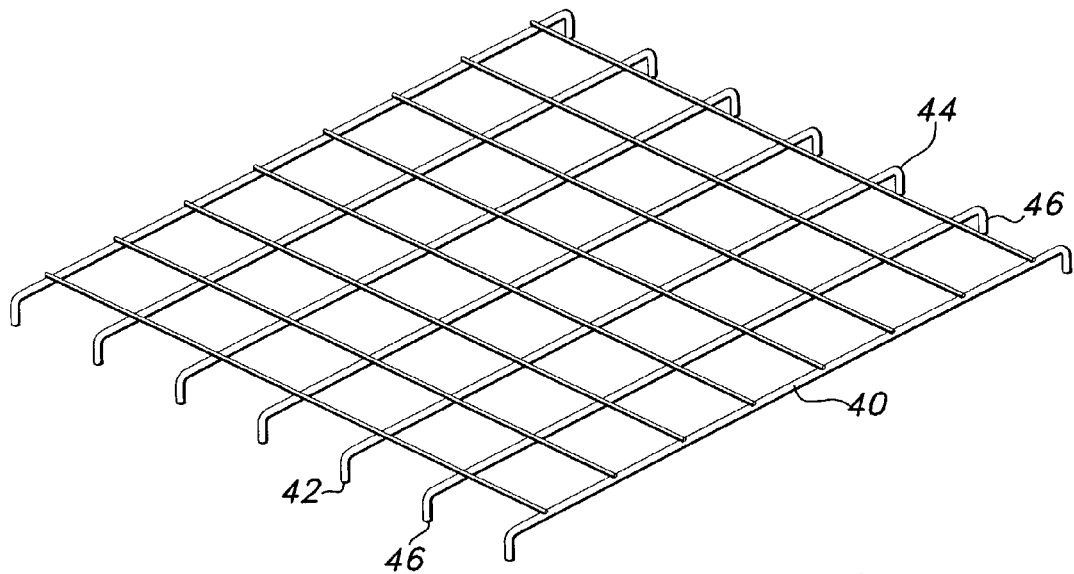
FIG. 6 is a perspective view of a first embodiment of a platform section.
Figure 7:
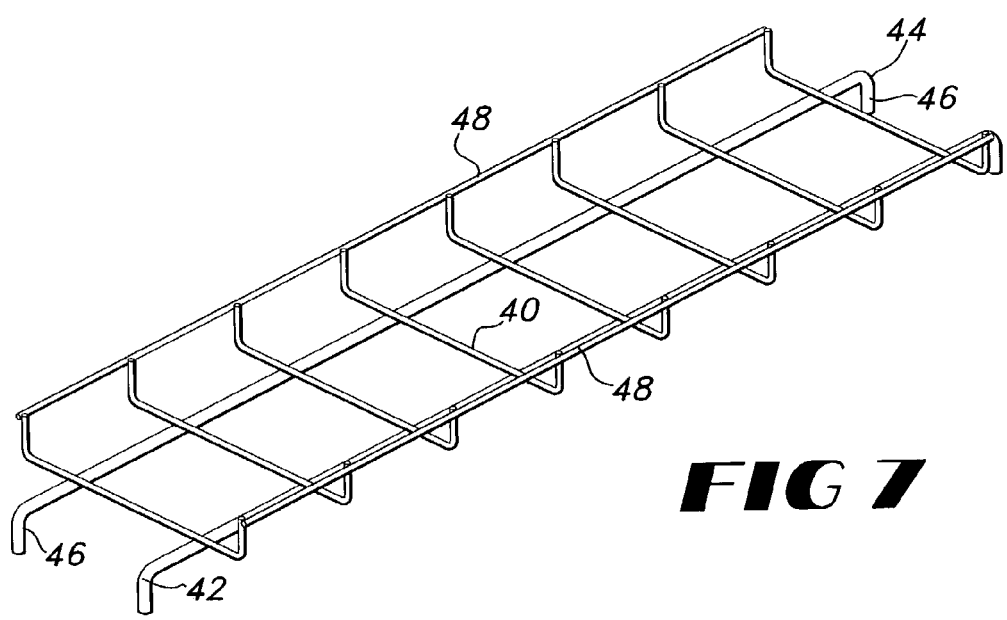
FIG. 7 is a perspective view of a second embodiment of a platform section.

Referring to FIGS. 1, 6, and 7, each platform section 40 is configured and dimensioned to support lengths of cable. One of the platform sections 40 is suspended from the stringer members 60 of a pair of opposing support pedestals 50, such as, for example, an opposing pair of first support pedestals 52, an opposing pair of first and second support pedestals 52, 54, and/or an opposing pair of first and third support pedestals 52, 56. The platform section 40 has a proximal edge 42 and an opposed distal edge 44 and at least a portion of the proximal and distal edges 42, 44 of the platform section 40 forms a downwardly extending flange 46. At least a portion of the flange 46 may be operatively received within the open channel 68 of the stringer element 60. The platform sections 40 may also have a upwardly extending lip 48 extending along each longitudinal edge to provide for retention of the cable bundles supported by the platform section 40.

Although the illustrated platform sections 40 are formed of a wire stock material, it is within the scope of the present disclosure to use other materials as well. For example, the platform section 40 may be formed of solid or woven fabrications of various metals, polymers, or any other material suitable for support cable bundles and runs thereon.

Figure 8:
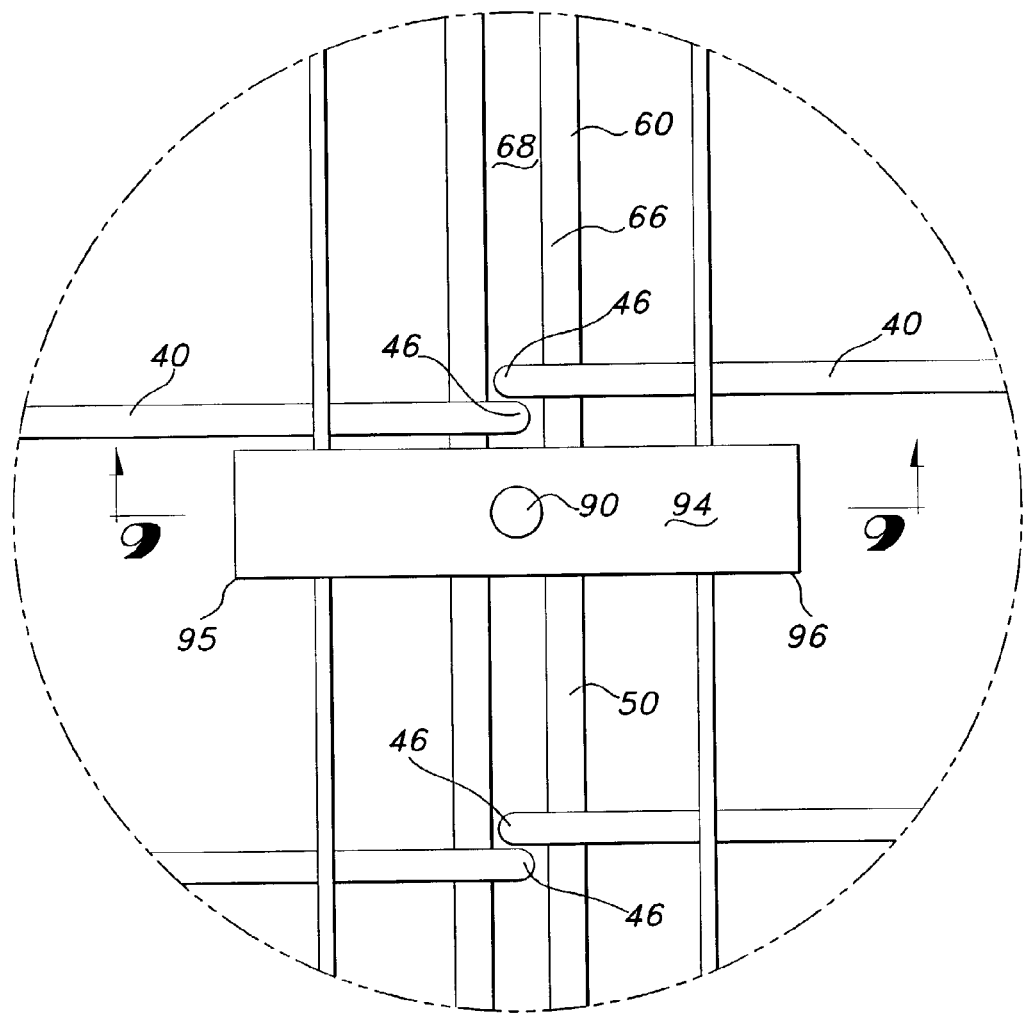
FIG. 8 is a partial top view of a portion of two adjacent platform sections secured to a channel extending therein the stringer member of a support pedestal.
Figure 9:
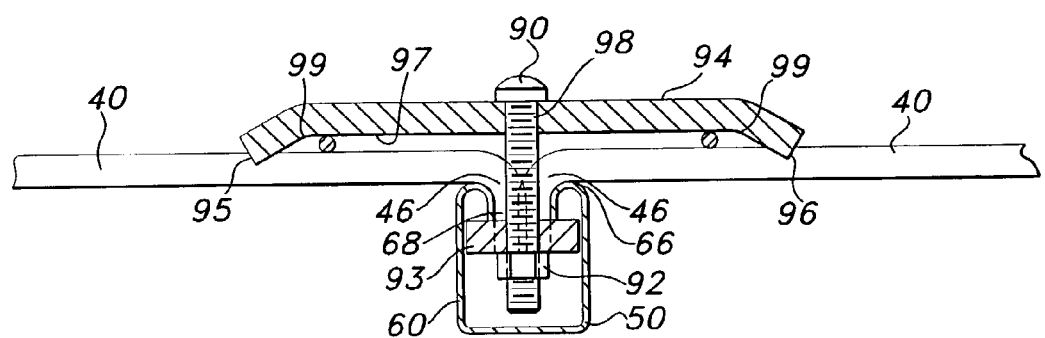
FIG. 9 is a cross-sectional side view taken along section line 9—9 of FIG. 8.

Referring now to FIGS. 1, 8, and 9, the open channel 68 of the stringer member 60 of a support pedestal 50 may be in operative receipt of portions of the downwardly extending flanges 46 of two adjoining platform sections 40. For securing portions of the two adjoining platform sections 40 to the stringer element 60, the cable tray support assembly may include a securing means. For example, the securing means may comprise a bolt 90, a nut 92, a washer 93, and an elongated clamp bar 94. The bolt 90 and the nut 92 are conventional and have complementary threaded surfaces so that they may be removably secured to each other. The clamp bar 94 has a first end 95, a opposing second end 96, and a mating surface 97 extending between the first end 95 and the second end 96. The clamp bar 94 further defines a hole 98 generally intermediate the first and second ends 95, 96 that extends traversally through the clamp bar 94. The clamp bar 94 may extend downwardly away as it approaches the first and second ends 95, 96 of the bar 94 so that the mating surface 97 has a bent portion 99 proximate each of the first and second ends 95, 96 (the clamp bar 94 thus having a slight U-shape in cross-section). The nut 92 and washer 93 are sized to fit within the interior of the stringer element 60 and at least the washer 93 is larger than the width of the open channel 68 of the stringer element 60. In use, the clamp bar 94 is placed over portions of the upper surface of the two adjoining platform sections 40, the bolt 90 is inserted through the hole 98 of clamp bar 94 and into operative connection with the complementary washer 93 and nut 92 to draw the mating surface 97 of the clamp bar 94 into operative connection with the two platform sections 40. If the platform sections 40 are made from wire stock, the clamp bar 94 is sized so that the bent portions 99 of the clamp bar 94 may grasp individual strands of wire stock in the adjoining platform sections 40.

In certain installations it may be desirable or necessary to install the cable support assembly 26 as a stand-alone modular assembly. It is within the scope of the present disclosure that in such an installation invention that the support columns 20 are independent stanchions or other suitable supports which are not also used to support the floor system (i.e., are not used to support the floor panels 24).

Referring to FIGS. 1 and 2, multiple levels of platform sections 40 may be constructed using the cable support assembly 26 outlined above. The multiple levels are placed between the subfloor 12 and the floor panels 24. While it is understood that various combinations of first, second, and third support pedestals 52, 54, 56 may be used depending upon the orientation of the desired pattern of the platform sections 40.

In the following example, a plurality of support pedestals 50 are provided for an exemplary construction of multiple levels of the present invention, in which each support pedestal 50 has a first upright sleeve member 70', a second upright sleeve member 70", and an elongated stringer member 60 (i.e., the support pedestal 50 for this example has the structure of the first support pedestal 52 as described above). Initially, the first sleeve member 70' and the second sleeve member 70" of a first support pedestal 50 are placed in overlying registration with the body portions 22 of a first pair of support columns 20 and the first sleeve member 70' and the second sleeve member 70" of a second support pedestal 50 in overlying registration with the body portions 22 of a second pair of support columns 20. Here, the second pair of support columns 20 are opposed to the first pair of support columns 20 to form a first pair of opposing support pedestals 50. Next, a first platform section 40 is suspended from the stringer members 60 of the first pair of opposing support pedestals 50.

The first sleeve member 70' and the second sleeve member 70" of a third support pedestal 50 may be placed in overlying registration with the body portions 22 of a third pair of support columns 20, the third pair of support columns 20 opposed to the second pair of support columns 20, to form a second pair of opposing support pedestals 50. A second platform section 40 may be suspended from the stringer members 60 of the second pair of opposing support pedestals 50 so that a portion of the first and second platform sections 40 are adjoined. If desired, a portion of the adjoined first and second platform sections 40 may be secured to the stringer element 60 of one support pedestal 50.

To form a level above the first platform section 40, the first sleeve member 70' and the second sleeve member 70" of a fourth support pedestal 50 are placed in overlying registration with the body portions 22 of the first pair of support columns 20 so that the bottom ends 74 of the first and second sleeve members 70', 70" of the fourth support pedestal 50 are in contact with the top ends 72 of the first and second sleeve members 70', 70" of the first support pedestal 50. Similarly, the first sleeve member 70' and the second sleeve member 70" of a fifth support pedestal 50 are placed in overlying registration with the body portions 22 of the second pair of support columns 20 so that the bottom ends 74 of the first and second sleeve members 70', 70" of the fifth support pedestal 50 are in contact with the top ends 72 of the first and second sleeve members 70', 70" of the second support pedestal 50. Thus, the fourth and fifth support pedestals 50 form a third pair of opposing support pedestals 50 from which a third platform section 40 may be suspended. In this fashion, the third platform section 40 is spaced apart from and suspended above the first platform section 40 to form a second level intermediate the subfloor 12 and the floor panels 24.

In an alternative embodiment shown in FIGS. 10–17, in which the components in FIGS. 10–17 that have the same reference numbers as in FIGS. 1–9 are substantially equivalent and the description thereof is omitted for this embodiment, the cable tray support assembly 26 includes a plurality of pedestals 100 and a platform section 40. By installing a plurality of pedestals 100, which includes at least one pair of pedestals that may be opposed to each other, onto the subfloor 12, a pattern of pedestals 100 can be assembled to support one or more platform sections 40 along a specific route between the subfloor 12 and the upper surface of the raised floor system 10.

Generally, the height of the pedestals 100 can be varied to position platform sections 40 at a more convenient level. Further, the width of the pedestals 100 can be varied to accommodate platform sections 40 of variable width. In addition, if the need arises to have multiple routes for cables between subfloor 12 and the upper surface of raised floor system 10, this embodiment of the cable tray support assembly 26 can provide support for a multiple number of platform sections 40 to form multiple levels of platform sections 40 between the subfloor 12 and the floor panels 24.

Figure 10:
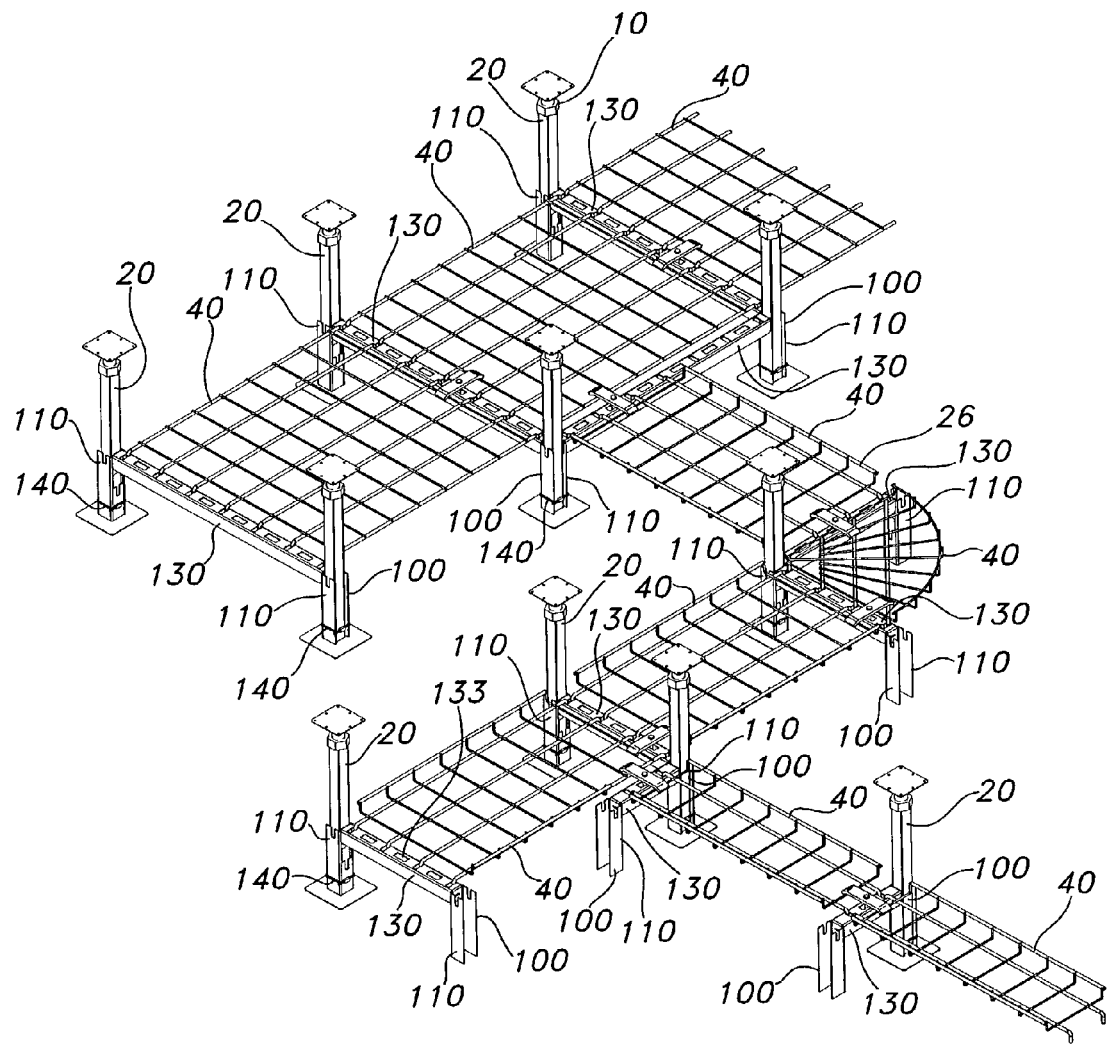
FIG. 10 is a partial perspective view of an alternative embodiment of a cable management system constructed in accordance with the present disclosure.
Figure 11:
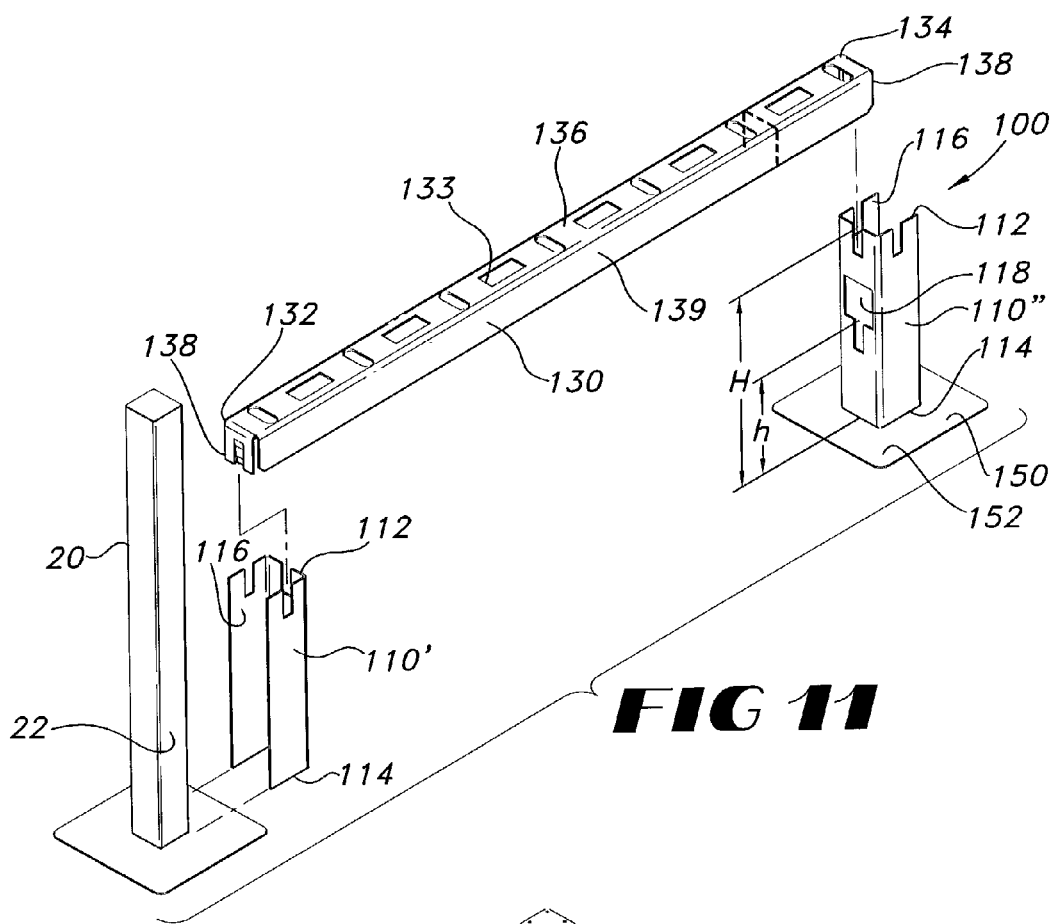
FIG. 11 is an exploded perspective view of an alternative embodiment of a cable tray support assembly, showing a pedestal having a pair of opposing channel members and an elongated stringer member and showing a cross-sectional view of the channel member and the stringer member.
Figure 12:
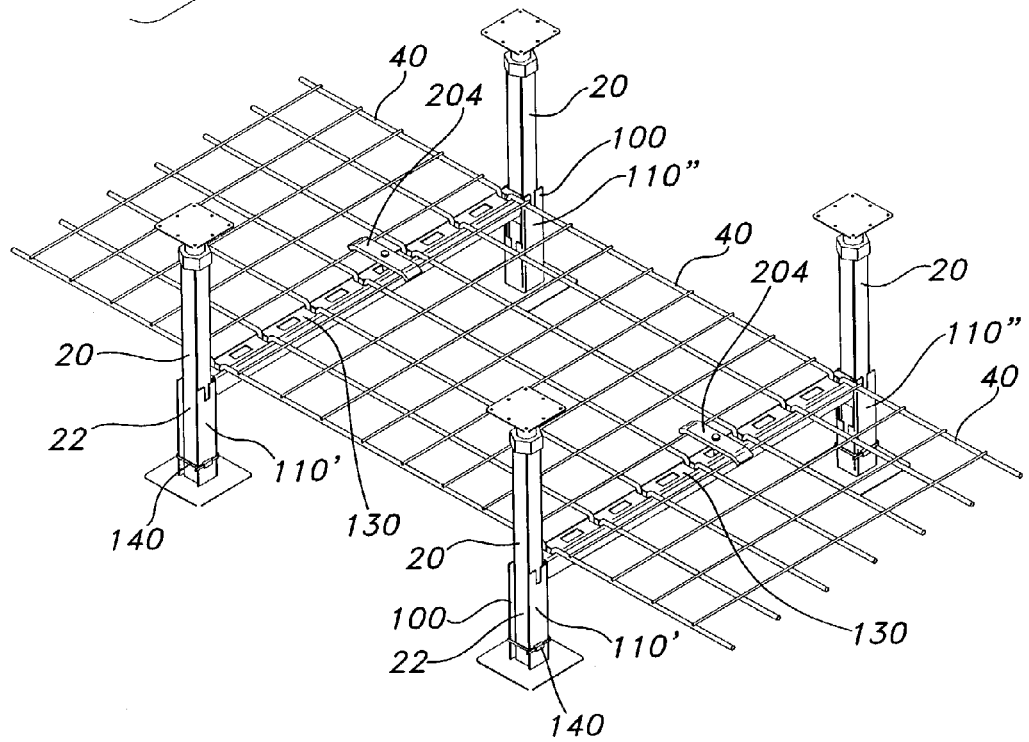
FIG. 12 is a partial perspective view of a cable tray support assembly of the present invention, showing a platform section suspended above the surface from the stringer members of a pair of pedestals.
Figure 15:
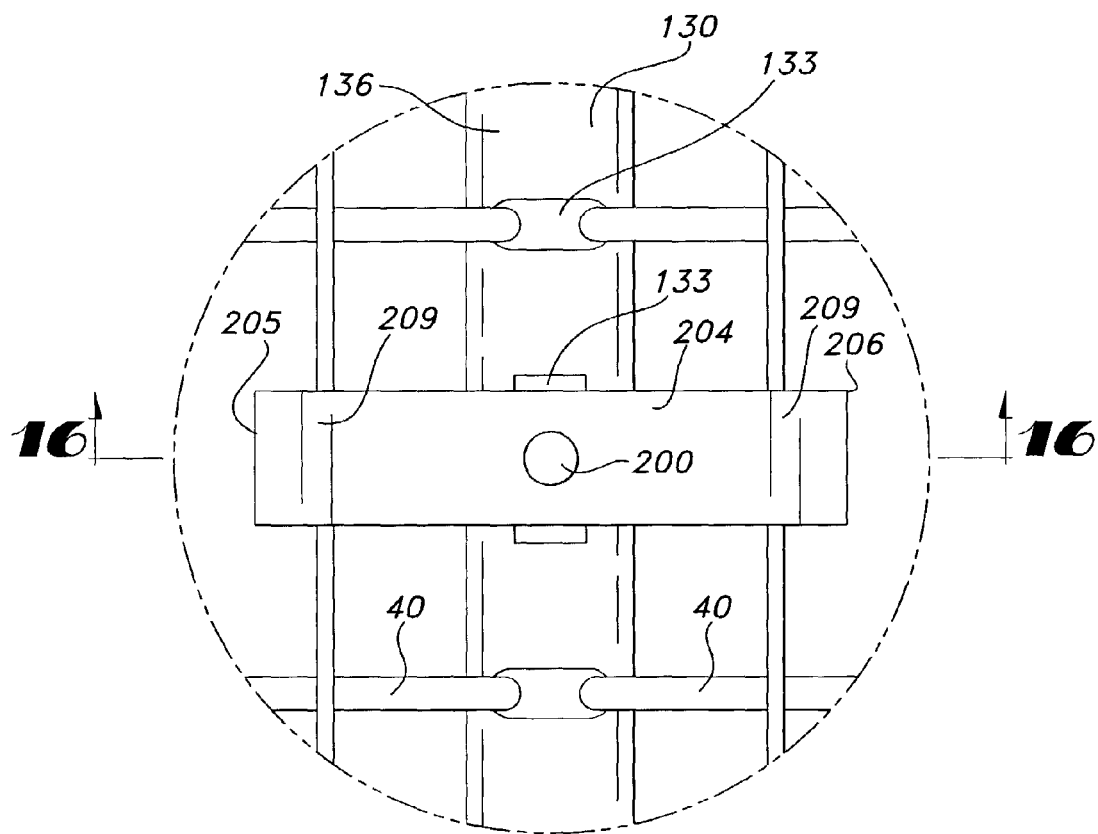
FIG. 15 is a partial top view of a portion of two adjacent platform sections secured to at least one opening extending therein the stringer member of a pedestal.
Figure 16:
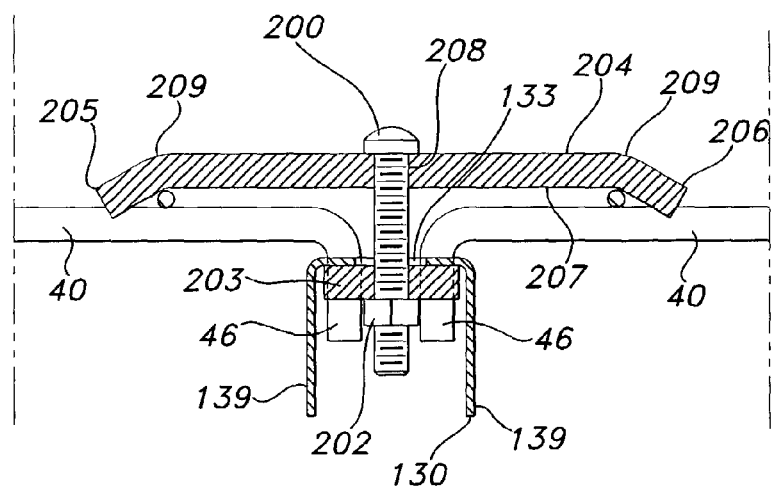
FIG. 16 is a cross-sectional side view taken along section line 16—16 of FIG. 14.

Referring to FIGS. 10–12, each pedestal 100 has a pair of opposing, spaced, upright channel members 110 and an elongated stringer member 130. Each channel member 110 has a top end 112, a bottom end 114, and defines a channel 116 extending from the top end 112 through the bottom end 114. To spatially orient the pedestal to the floor system 10, a portion of the channel 116 of at least one of the channel members 110 forming each pedestal 100 may be positioned adjacent to at least a portion of the body portion of one column 20 of a pair of opposing columns. Of course, there is no requirement that any portion of the pedestal 100 be positioned adjacent one of the columns as the cable tray support assembly of the present invention is self supporting, it is simply preferred that at least a portion of one of the channel members 110 of at least one of the pedestals 100 be positioned adjacent to one of the columns 20 of the floor system 10 to take advantage of the predetermined grid layout of the floor system.

The stringer member 130 has a proximal end 132 and an opposed distal end 134. Each stringer member 130 has a horizontally disposed surface 136 that extends between the proximal and distal ends. The stringer member 130 also has a pair of opposing downwardly extending flanges 138 that depend from the proximal and distal ends of the stringer member. That is, one flange 138 depends from the proximal end 132 of the stringer member 130 and the other flange 138 depends from the distal end 134 of the stringer member 130. The stringer member also preferable has a pair of opposing side flanges 139 depending downwardly from the side edges of the horizontally disposed surface and extending from the distal end to the proximal end of the stringer member 130 so that the stringer member has a general U-shape in vertical cross-section. As one will appreciate, each flange 138 is spaced from the respective end edges of the side flanges 139 so that the stringer member is mountable onto the channel member.

In use, the flange depending from the proximal end 132 of the stringer member 130 is removably connected to one of the channel members 110 and the flange depending from the distal end 134 of the stringer member 130 is removably connected to one other channel member 110 to support the stringer member 130 above the bottom ends 114 of the two connected channel members. For example, by releasably connecting the stringer member 130 proximate the respective top ends 112 of the pair of channel members 110, the elongated stringer member is supported above the respective bottom ends 114 of the channel members at a predetermined height H.

As one skilled in the art will appreciate, if the stringer member is connected to the top ends of the channel members, by varying the length of the channel members 110 between the top and bottom ends 112, 114, the predetermined height H of the stringer member 130 relative to the bottom ends 114 of the channel members of the pedestal 100 may be varied. It is contemplated that pedestals 100 having varied predetermined heights H may be used in the raised floor system 10. Further, to accommodate platform sections 40 of variable width, the channel members of the pedestal 100 may be spaced apart less then or equal to the first predetermined distance $D_1$.

Figure 17:
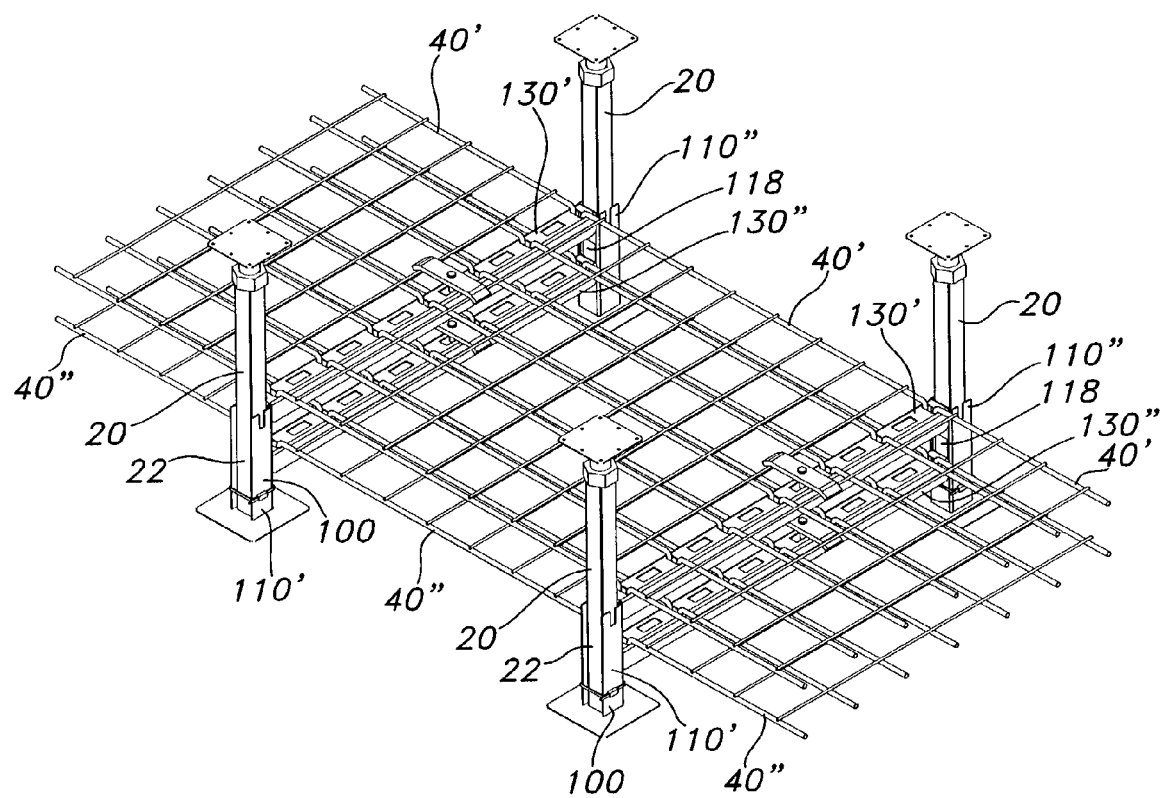
FIG. 17 is a partial perspective view of the present invention showing multiple levels of platform sections suspended above the surface from the stringer members of a pair of opposing pedestals.

Alternatively, as shown in FIG. 17, it is contemplated that each channel member may define at least one opening 118 intermediate the top end 112 and bottom end 114 of the channel member 110. The opening is sized for complementary receipt of one flange of the stringer member 130. In use, the flanges 138 of one stringer member 130 could be connected to opposing openings 118 in two channel members such that the elongated stringer member 130 is supported above the respective bottom ends 114 of the channel members at a predetermined height h, which is less than the predetermined height H. A second stringer member 130 could be connected to the top ends 112 of the same two channel members 100 so that the second stringer member 130 is supported above the respective bottom ends 114 of the channel members 110 at the predetermined height H. When connected to the pair of channel members 110, the stringer members 130 of the pedestal 100 are substantially parallel to other and are substantially co-planar with the respective stringer members 130 of the adjoining support pedestal 110. Thus, it will be appreciated that multiple levels of stringer members 130 may be supported by the pair of channel members 100 forming the pedestal 100. This allows for the construction and installation of multiple levels of stringer members and platform sections between the subfloor 12 and the floor panels of the floor system.

As shown in FIGS. 10–12 and 17, at least a portion of the channel 116 of at least one of the channel members 110 of each pedestal 100 preferably overlies at least a portion of the body portion 22 of one support column 20. If the pair of channel members of the pedestal 100 are spaced apart the first predetermined distance $D_1$, then the each of the channel members of the pedestal may be positioned in partial overlying registration, to the body portion 22 of the two support columns 20. By positioning a portion of the channel 116 of at least one of the channel members 110 of the pedestal in partial overlying registration to at least a portion of the body portion 22 of one column 20 of a pair of columns, which may be opposed to each other, the channel member 110 is oriented spatially relative to the adjacent or adjoining column. As one will appreciate, the channel member 110 of the pedestal 100 may be positioned so that it abuts a portion of the column 20. As one will also appreciate, the connection that occurs between the pedestals 100 and the support columns 20 provides an excellent electrical ground for the cable tray support assembly.

The cable tray support assembly 26 of the present invention may also include at least one cable tie 140. In use, one channel member 110 is positioned so that is abuts a portion of the column 20 and the cable tie 140 is secured, in overlying registration, to a portion of the channel member and a portion of the column. By securing the channel member 110 to the column 20 in this fashion, the spacial orientation of the channel member with respect to the column and the electrical ground connection are maintained.

For example, to assemble a portion of the cable tray assembly 26 to the raised floor system 10, the first and second channel members 110', 110" of one pedestal 100 may be positioned adjacent to the respective body portions 22 of a first pair of columns 20 in partial overlying registration, and the first and second channel members 110', 110" of a second pedestal 100, may be removably connected to the respective body portions 22 of a second pair of support columns 20 to form a pair of pedestals 110. The second pedestal may be opposed to the first pedestal to form a pair of opposing pedestals.

Alternatively, it is contemplated that, if the width of the pedestal 100 is less than the first predetermined distance $D_1$, one of either the first or the second channel members 110', 110" of each of the opposing pedestals 100 will be positioned adjacent to and in partial overlying registration with the body portions 22 of two adjacent support columns 20 to form the pair of opposing pedestals. The channel member 110 of the pedestal 100 that is not positioned adjacent a support column 20 may be disposed on and supported by the subfloor 12 or a plate 150 disposed thereon the subfloor. The plate 150 has an upper surface 152 and the bottom end 114 of the channel member 110 may be connected to the upper surface 52 of the plate.

The channel 116 of the channel members 110 may have a shape that is complementary to the exterior surface shape of the body portion 22 of the column 20. For example, as shown in FIGS. 10 and 11, the body portion 22 of the support column 20 is generally rectangular or square in horizontal cross-section and the channel member is substantially "U" shaped in horizontal cross-section. In this example, the channel 116 of the channel member 110 also is "U" shaped which allows it to be positioned in complementary fashion to a portion of the body portion 22 of the column 20. As one will appreciate, having complementary shapes for the channel 116 of the channel members 110 and the body portion 22 of the columns 20 allows for quick and orderly orientation of the individual pedestals 100 relative to the connected support columns 20 which decreases labor costs because the installation may be completed in less time. However, there is no requirement that the channel 116 of the channel members 110 and the body portion 22 of the columns 20 have a complementary shape, i.e., for example the body portion 22 could have a circular cross-section and the channel 116 could have a "U" shaped cross-section. It is preferred that the channel 116 of the channel member 110 be able to be placed into removable partial overlying registration with a portion of the body portion 22 of the column 20.

As shown in FIGS. 11, 13, 14, and 17, the flange 138 of each stringer member 130 may also include an elongate tongue member 160 for releasably securing the stringer member to the respective channel members 110. To accommodate the tongue member 160, each of the channel members 110 defines at least one slot 119 extending therethrough the channel member. Each tongue member 160 being constructed and arranged, sized or shaped for abutting engagement with one of the slots 119 in the channel member. For example, at least one substantially upright slot 119 may be defined in the top end 112 of each of the channel members 110 of the pedestal 100 so that a stringer member having tongue members can be connected to the respective top ends of the pair of channel members. Alternatively, if the channel member 110 defines the opening 118 intermediate the top and bottom ends of the channel member, the opening 118 in the channel member 110 can communicate with a slot 119 to form a generally T-shaped opening 118 so that a stringer member having tongue members 160 can be connected to opposing openings 118 in the pair of channel members 110. In this example, the slot is also substantially upright.

The flange 138 has an end face 135 and each of the tongue members 160 has a first end 162 and a spaced second end 164. The first end is proximate a portion of the end face 135 of the flange. The tongue member 160 is shaped so that at least a portion of the tongue member intermediate the first end 162 and the second end 164 is angled with respect to the end face 165 of the flange 160. As shown in FIGS. 13 and 14, the shape of the tongue member 160 has the tongue member positioned inward toward the interior of the stringer member 130 relative to the overall flange member 138. In one example, it is preferred that a bottom edge 137 of the flange 138 is co-planar to the second end 164 of the tongue member 160.

The channel member 110 also has an inner surface 117 and the tongue member 160 has a mating surface 166 defined proximate the second end 164 of the tongue member. In use, at least a portion of the mating surface 166 of each tongue member overlies and abuts a portion of the inner surface 117 of the channel member 110 near the slot 119 defined in the channel member. As noted above, the slot 119 may also form a portion of the opening 118 in the channel member 110 intermediate the top end and bottom end of the channel member, i.e., the exemplified T-shaped opening.

Preferably, the slot 119 has a pair of opposing side edges 115 and each tongue member 160 has a first side edge 168 and an opposing second side edge 169 that extend from the first end of the tongue member to the second end thereto. In this example, when the flange 138 is connected to the channel member 110, at least a portion of the first and second side edges 168, 169 of the tongue member 160 are in abutting engagement with a portion of the side edges 115 of the slot 119 so that lateral movement between the channel member 110 and the stringer member 139 is prevented or minimized.

It will be appreciated that the described system provides significant savings in material costs and installation labor costs in comparison with prior art cable tray systems which require the cable tray assembly to be mechanically fastened to the every "connected" column.

Referring to FIGS. 10, 12, and 15–16, and as noted above, each platform section 40 is configured and dimensioned to support lengths of cable. One of the platform sections 40 is suspended from the stringer members 130 of a pair of opposing pedestals 100. To accommodate the platform section, the horizontally disposed surface 136 of the stringer member 130 defines a plurality of openings 133 so that at least a portion of the flange 46 may be operatively received within at least one opening 133 in the horizontally disposed surface of the stringer member.

The openings 133 in the horizontally disposed surface 136 of the stringer member 130 of a pedestal 100 may be in operative receipt of portions of the downwardly extending flanges 46 of two adjoining platform sections 40. For securing portions of the two adjoining platform sections 40 to the stringer element 130, the cable tray support assembly may include a securing means. For example, the securing means may comprise a bolt 200, a nut 202, a washer 203, and an elongated clamp bar 204. The bolt 200 and the nut 202 are conventional and have complementary threaded surfaces so that they may be removably secured to each other. The clamp bar 204 has a first end 205, a opposing second end 206, and a mating surface 207 extending between the first end 205 and the second end 206. The clamp bar 204 further defines a hole 208 generally intermediate the first and second ends 205, 206 that extends traversally through the clamp bar 204. The clamp bar 204 may extend downwardly away as it approaches the first and second ends 205, 206 of the bar 204 so that the mating surface 207 has a bent portion 209 proximate each of the first and second ends 205, 206 (the clamp bar 204 thus having a slight U-shape in cross-section). The nut 202 and washer 203 are sized to fit within the interior of the stringer element 130 and at least the washer 203 is larger than the width of the opening 133 in the horizontally disposed surface 136 of the stringer member 130. In use, the clamp bar 104 is placed over portions of the upper surface of the two adjoining platform sections 40, the bolt 200 is inserted through the hole 208 of clamp bar 204 and one opening 133 in the horizontally disposed surface of the stringer member and into operative connection with the complementary washer 203 and nut 202 to draw the mating surface 207 of the clamp bar 204 into operative connection with the two platform sections 40. If the platform sections 40 are made from wire stock, the clamp bar 204 is sized so that the bent portions 209 of the clamp bar 204 may grasp individual strands of wire stock in the adjoining platform sections 40.

In certain installations it may be desirable or necessary to install the cable support assembly 26 as a stand-alone modular assembly. It is within the scope of the present disclosure that in such an installation invention that the support columns 20 are independent stanchions or other suitable supports which are not also used to support the floor system (i.e., are not used to support the floor panels 24). As one will appreciate, the cable tray support assembly 26 may be formed without any use of support columns or independent stanchions or other support structure as the assembly is self supporting.

Although the illustrative embodiments of the present disclosure have been described herein with reference to the accompanying drawings, it is to be understood that the disclosure is not limited to those precise embodiment, and the various other changes and modifications may be affected therein by one skilled in the art without departing from the scope of spirt of the disclosure. All such changes and modifications are intended to be included within the scope of the disclosure as defined by the appended claims.

What is claimed is:

1. A modular cable management system, comprising:
   a plurality of upright fixed columns of a raised floor system, the columns spaced apart from each other a first predetermined distance, each column having a body portion, wherein an end portion of the column bears on a plurality of first area portions of a subfloor;
   a self-supporting cable tray support system, comprising:
   (a) a plurality of pedestals, each pedestal comprising an elongated stringer member, a first upright channel member, and a second upright channel member, the stringer member having a proximal end, an opposed distal end, and an opposing pair of downwardly extending flanges, one flange depending from the proximal end of the stringer member and the opposing flange depending from the distal end of the stringer member, each of the first and second channel members extending longitudinally between a top end and an opposed bottom end, and defining a trough shaped channel that extends longitudinally from the top end to the bottom end, each of the first and second channel members further defining an opening that extends longitudinally therefrom the top end to the bottom end and is in communication with an interior of the trough shaped channel, wherein the opening has a horizontal cross-sectional width dimension that is at least the width dimension of the body portion of the column of the raised floor system, wherein the flange depending from the proximal end of the stringer member is removably connected to the first channel member and the flange depending from the distal end of the stringer member is removably connected to the second channel member so that the elongated stringer member is supported above the bottom ends of the first and second channel members, wherein each of the channel members is an independent stanchion, and wherein and end portion of the channel members bears on a plurality of second area portions of the subfloor, the second area portions being different from the first area portions;

(b) a platform section configured and dimensioned to support lengths of cable thereon, wherein the platform section is suspended from the stringer members of a pair of opposing pedestals;

(c) a means for passing the body portion of at least one column through the opening in the channel member and into the interior of the trough shaped channel such that the channel of the channel member is positioned adjacent to and substantially parallel to at least a portion of the body portion of the column, wherein the channel of the channel member is configured to partially surround a portion of the body portion of the column, and wherein the cable tray support system is spacially oriented relative to the raised floor system; and (d) a means for positioning a portion of one of the respective first and second channel members in electrical communication with a portion of one of the plurality of upright, fixed columns of the floor system to form an electrical ground for the cable tray support system.

2. The modular cable management system of claim 1, wherein the stringer member has a horizontally disposed surface that defines a plurality of openings, wherein the platform section has a proximal edge and an opposed distal edge, at least a portion of the proximal and distal edges each forming a downwardly extending flange, and wherein the downwardly extending flanges of the platform section are configured to be received within at least one opening in the horizontally disposed surface of the stringer member.

3. The modular cable management system of claim 2, further comprising a plurality of platform sections which comprises at least two adjoining platform sections, wherein portions of the downwardly extending flanges of two adjoining platform sections are operatively received within at least one opening in the horizontally disposed surface of the stringer member, and securing means for securing portions of the two adjoining platform sections to the stringer element.

4. The modular cable management system of claim 1, wherein the first and second channel members are configured to be spaced apart less than the first predetermined distance, and wherein one of the first or second channel members of one pedestal is disposed thereon a subfloor.

5. The modular cable management system of claim 1, further comprising a plate having an upper surface, the plate disposed thereon the subfloor, wherein the first and second channel members are configured to be spaced apart less than the first predetermined distance, and wherein the bottom end of one of the first or second channel members is connected to the upper surface of the plate.

6. The modular cable management system of claim 1, wherein each of the first and second channel members of one pedestal are configured to abut, in partial overlying registration, portions of the respective body portions of the pair of opposing columns to form the electrical ground for the cable tray support system.

7. The modular cable management system of claim 1, further comprising at least one cable tie, the cable tie secured, in overlying registration, to a portion of at least one of the first or second channel members and a portion of the respective adjoining column to maintain spatial orientation of the first or second channel member with respect to its respective adjoining column.

8. The modular cable management system of claim 1, wherein the flange depending from the proximal end of the stringer member is removably connected to a portion of the top end of the first channel member.

9. The modular cable management system of claim 1, wherein the flange depending from the distal end of the stringer member is removably connected to a portion of the top end of the second channel member.

10. The modular cable management system of claim 1, wherein each flange of the stringer member comprises an elongate tongue member configured for releasably securing the stringer member to the channel members, wherein each of the channel members defines at least one slot extending therethrough the channel member, each tongue member configured for abutting engagement with one of the slots.

11. The modular cable management system of claim 10, wherein the flange has an end face, wherein each of the tongue members has a first end proximate a portion of the end face of the flange and a spaced second end, at least a portion of the tongue member intermediate the first and second ends of the tongue member angled with respect to the end face of the flange.

12. The modular cable management system of claim 11, wherein each flange has a bottom edge, and wherein the second end of the tongue member is co-planar to the bottom edge of the flange.

13. The modular cable management system of claim 11, wherein each channel member has an inner surface, and wherein each tongue member has a mating surface defined proximate the second end of the tongue member, so that, in operation, at least a portion of the mating surface of each tongue member is configured to overlie and abut a portion of the inner surface of the channel member near the slot in the channel member.

14. The modular cable management system of claim 11, wherein the slot has a pair of opposing side edges, wherein each tongue member has a first side edge and an opposing second side edge, the first and second side edges extending from the first end of the tongue member to the second end thereto, whereby, in connected operation, at least a portion of the first and second side edges are in abutting engagement with a portion of the side edges of the slot so that lateral movement between the channel member and the stringer member is prevented.

15. The modular cable management system of claim 11, wherein at least one T-shaped opening is defined in the top end of the channel member.

16. The modular cable management system of claim 15, wherein at least one slot is defined intermediate the top end and the bottom end of the channel member.

17. The modular cable management system of claim 16, wherein multiple levels of stringer members and platform sections are installed above the subfloor and the floor panels.

18. The modular cable management system of claim 1, wherein the platform section is formed of wire stock.

19. A method of assembling a cable tray support system for a raised floor system having a plurality of upright, fixed columns disposed in a predetermined grid array onto a subfloor, the predetermined grid array forming a plurality of pairs of columns, an end portion of the column bearing on a plurality of first area portions of the subfloor, the method comprising:

providing a plurality of pedestals, each pedestal comprising an elongated stringer member, a first upright channel member, and a second upright channel member, the stringer member having a proximal end, an opposed distal end, and an opposing pair of downwardly extending flanges, one flange depending from the proximal end of the stringer member and the opposing flange depending from the distal end of the stringer member, each of the first and second channel members extending longitudinally between a top end and an opposed bottom end, and defining a trough shaped channel that extends longitudinally from the top end to the bottom end, each of the first and second channel members further defining an opening that extends longitudinally therefrom the top end to the bottom end and is in communication with an interior of the trough shaped channel, wherein the opening has a horizontal cross-sectional width dimension that is at least the width dimension of the body portion of the column of the raised floor system, wherein the channel of the channel member is configured to partially surround a portion of the body portion of the column, wherein the elongated stringer member is supported above the bottom ends of the first and second channel members of each respective pedestal, wherein the bottom end of the channel members bear on a plurality of second area portions of the subfloor, the second area portions being different from the first area portions;

positioning at least one of the respective first and second channel members of a first pedestal relative to a first pair of columns of the raised floor system to spatially orient the pedestal to the raised floor system, the step of positioning comprising passing the body portion of one column of the first pair of columns through the opening in one of the respective first and second channel members of the first pedestal and into the interior of the trough shaped channel such that the channel of the at least one of the channel members of the first pedestal is positioned adjacent to and substantially parallel to at least a portion of the body portion of the column;

positioning at least one of the respective first and second channel members of a second pedestal relative to a second pair of columns of the raised floor system, the step of positioning comprising passing the body portion of one column of the second pair of columns through the opening in one of the respective first and second channel members of the second pedestal and into the interior of the trough shaped channel such that the channel of the at least one of the channel members is positioned adjacent to and substantially parallel to at least a portion of the body portion of the column, wherein the second pair of columns is opposed to the first pair of columns, and wherein the first and the second pedestals form a first pair of opposing pedestals; and suspending a first platform section from the stringer members of the first pair of opposing support pedestals, the platform section being configured and dimensioned to support lengths of cable thereon, wherein the cable tray support system is self-supporting, and wherein at least a portion of one of the channel members is positioned in electrical communication with a portion of one of the plurality of upright columns of the floor system to form an electrical ground for the cable tray support system.

20. The method of claim 19, further comprising:

placing at least one of the first channel member and the second channel member of a third pedestal adjacent to, parallel to and in partial overlying registration with a portion of a third pair of columns, the third pair of columns opposed to the second pair of columns, the second and the third pedestals forming a second pair of opposing pedestals; and suspending a second platform section from the stringer members of the second pair of opposing pedestals, wherein a portion of the first and second platform sections are adjoined.

21. The method of claim 20, further comprising securing a portion of the adjoined first and second platform sections to the stringer element of one pedestal.

22. The method of claim 19, wherein each flange of the stringer member comprises an elongate tongue member, wherein each of the channel members defines at least one slot extending therethrough the channel member at the top end of the channel member, each tongue member configured for abutting engagement with one of the slots, and wherein the step of providing the pedestals comprises connecting the flange depending from the proximal end of the stringer member to a portion of the top end of the first channel member so that the tongue member is inserted into the slot in the top end of the first channel member and connecting the flange depending from the distal end of the stringer member to a portion of the top end of the second channel member so that the tongue member is inserted into the slot in the top end of the second channel member.

23. The method of claim 19, further comprising:

providing at least one cable tie; and securing the cable tie, in overlying registration, to a portion of at least one of the first and the second channel members and to a portion of the respective adjoining column to maintain the spatial orientation of the first or second channel member with respect to the column to which it is secured.

* * * * *